United States Patent
Ootsuka et al.

(10) Patent No.: US 9,137,872 B2
(45) Date of Patent: Sep. 15, 2015

(54) LED LIGHTING DEVICE

(75) Inventors: Yasunori Ootsuka, Tokyo (JP); Takashi Ohsawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 272 days.

(21) Appl. No.: 13/823,686

(22) PCT Filed: Jan. 11, 2011

(86) PCT No.: PCT/JP2011/000069
§ 371 (c)(1),
(2), (4) Date: Mar. 14, 2013

(87) PCT Pub. No.: WO2012/095889
PCT Pub. Date: Jul. 19, 2012

(65) Prior Publication Data
US 2013/0169191 A1     Jul. 4, 2013

(51) Int. Cl.
*H05B 37/02* (2006.01)
*H05B 33/08* (2006.01)

(52) U.S. Cl.
CPC .......... *H05B 33/0878* (2013.01); *H05B 33/089* (2013.01); *H05B 33/0815* (2013.01)

(58) Field of Classification Search
CPC ........... H05B 33/0815; H05B 33/0878; H05B 33/089
USPC ............................... 315/77, 82, 302, 307, 308
See application file for complete search history.

(56) References Cited

U.S. PATENT DOCUMENTS

| | | |
|---|---|---|
| 2004/0080273 A1 | 4/2004 | Ito et al. |
| 2004/0207328 A1 | 10/2004 | Ito et al. |
| 2006/0175901 A1 | 8/2006 | Murakami et al. |
| 2007/0103098 A1 | 5/2007 | Shiotsu et al. |
| 2007/0285031 A1 | 12/2007 | Shteynberg et al. |
| 2008/0203946 A1 | 8/2008 | Ito et al. |
| 2009/0267520 A1 | 10/2009 | Matsui et al. |
| 2010/0117538 A1 | 5/2010 | Fujino |
| 2013/0088172 A1* | 4/2013 | Kikuchi et al. ............... 315/307 |
| 2013/0278165 A1* | 10/2013 | Kikuchi et al. ............... 315/224 |

FOREIGN PATENT DOCUMENTS

| | | |
|---|---|---|
| DE | 10 2009 052 556 A1 | 7/2010 |
| DE | 10 2009 017 989 A1 | 10/2010 |
| JP | 2004-134147 A | 4/2004 |
| JP | 2004-314808 A | 11/2004 |
| JP | 2006-221886 A | 8/2006 |
| JP | 2007-126041 A | 5/2007 |
| JP | 2008-205357 A | 9/2008 |
| JP | 2009-266723 A | 11/2009 |
| JP | 2009-272569 A | 11/2009 |
| JP | 2009-302295 A | 12/2009 |

\* cited by examiner

*Primary Examiner* — William Hernandez
(74) *Attorney, Agent, or Firm* — Birch, Stewart, Kolasch & Birch, LLP

(57) ABSTRACT

When an output current is shut off by disconnection, a control unit 7 causes a DC/DC converter 3 to immediately stop temporarily for suppression of an over-current at the time of restoration, and further causes the DC/DC converter 3 to repeat an temporary stop and an temporary operation by a predetermined number of times or for a predetermined period of time, in order to check whether the shut-off of the output current is transient or continuous, and causes the DC/DC converter 3 to stop continuously if the shut off is continuous, and extinguish an LED light source 4.

4 Claims, 7 Drawing Sheets

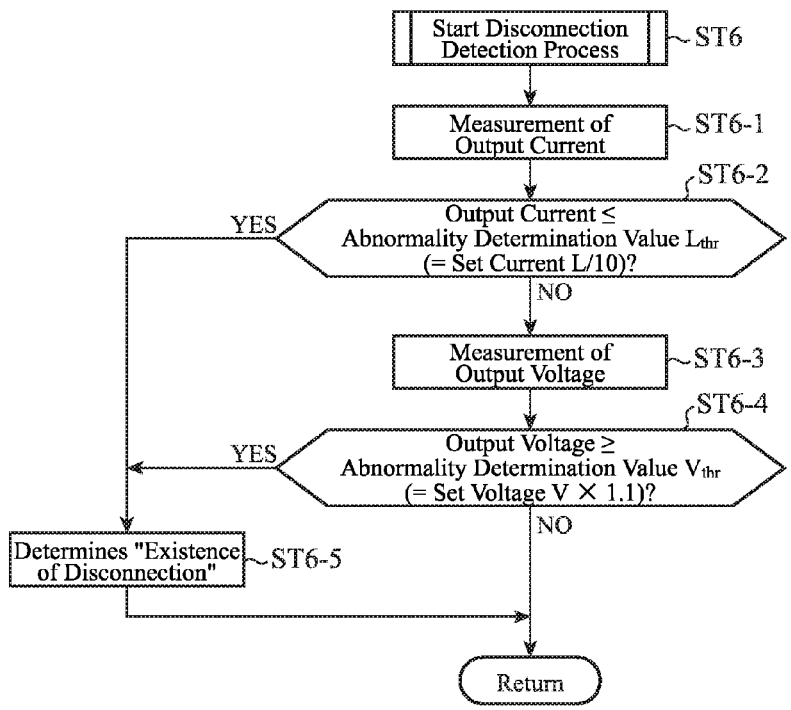
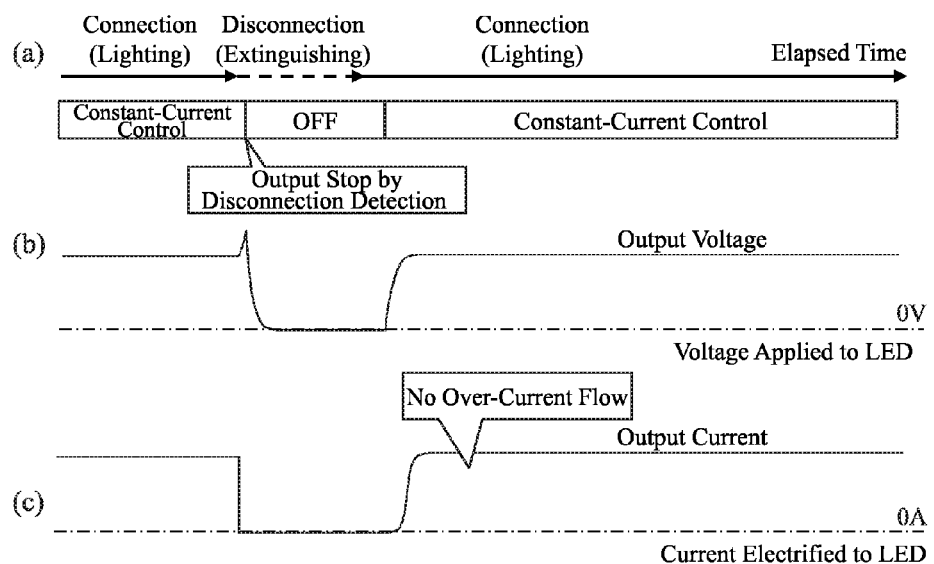

LED LIGHTING DEVICE

TECHNICAL FIELD

The present invention relates to an LED lighting device for lighting an LED (Light Emitting Diode) used as a light source for vehicle-mounted head lamp and the like.

BACKGROUND ART

In place of a conventional halogen lamp, a long-life and maintenance-free LED has been popular as a light source used for a vehicle-mounted head lamp. Since the LED has a long life and can ensure required brightness with lower power, and further can keep almost stable brightness by simple control that supplies a constant current thereto, it is suitable for a vehicle-mounted light source.

In addition, since the LED generally exhibits a constant voltage characteristic during lighting, which makes it difficult to control an amount of emission thereof based on an application voltage, it is typical to carry out the lighting through the use of a lighting device of constant-current control that outputs a constant current.

Incidentally, when the LED is under lighting with the lighting device of constant-current control, if the LED or a wiring for connecting the LED is disconnected, the lighting device increases an output voltage thereof in order to keep an output current thereof constant, so that excessive charges are accumulated in a smoothing capacitor of a DC/DC converter. In the case where the disconnection is restored in such a situation, an excessive current due to the charges discharged by the smoothing capacitor is electrified to the LED when the output current starts to flow, which may deteriorate the LED due to the over-current.

It is known that the disconnection and restoration (namely, intermittence) is induced by vibrations of the vehicle, for example, when the connection of a wiring or a connector is incomplete, and for a configuration coping with the intermittent connection, Patent Documents 1 to 4, for example, are proposed.

In Patent Document 1, a lighting circuit for lighting an LED includes a DC/DC inverter whose switching regulator applies to the LED an output voltage based on a source voltage received from a DC power source externally provided to thereby feed a supply current to the LED, and an abnormality of the lighting circuit is detected based on at least one of the output voltage, supply voltage and source voltage of the switching regulator, to thereby stop the switching regulator from outputting. In particular, when the abnormality is detected based on the source voltage, the output voltage of the switching regulator is decreased or stopped, and when the abnormality becomes undetected, the operation of the switching regulator is restarted.

In Patent Document 2, in a lighting control device for lighting an LED, in the event that a chattering phenomenon such that a lead wire connected with the LED is released from a contactor and then connected with the contactor again, in order to avoid a matter that an over-current flown in the LED causes a failure thereof, the over-current is suppressed in such a manner that a resistor is connected in series when the current supplied from a switching regulator to the LED is in a transient state. In addition, the device includes an NMOS transistor for bypassing the resistor connected in series during a normal lighting.

In Patent Document 3, a driving device for lighting an LED includes a voltage clamp unit that is connected in parallel to an output unit of a DC/DC converter, and that suppresses an abnormal voltage when a voltage supplied from the DC/DC converter to the LED varies temporarily due to disconnection or the like.

In Patent Document 4, in a lighting device serving to reduce the brightness of an LED by intermitting a current flown through the LED connected to the output side of a DC/DC converter, an NMOS transistor for intermittence is designed to have a constant-current characteristic in order to suppress an overshoot current produced in an intermittent operation.

PRIOR ART DOCUMENTS

Patent Documents

Patent Document 1: Japanese Patent Application Laid-open No. 2004-134147 (paragraphs [0043] to [0045])
Patent Document 2: Japanese Patent Application Laid-open No. 2007-126041
Patent Document 3: Japanese Patent Application Laid-open No. 2009-272569 (paragraph [0009])
Patent Document 4: Japanese Patent Application Laid-open No. 2008-205357

SUMMARY OF THE INVENTION

According to Patent Document 1, even though an excessive current at the time of the occurrence of a continuous abnormal situation can be suppressed, an excessive current electrified to the LED for a short time cannot be suppressed. Also, with the configuration of Patent Document 1, there is a problem, as indicated in Patent Document 3, such that a light output is lowered due to improper detection of abnormality caused by electrical noises, and the following false operation is unavoidable: if the output of the switching regulator is stopped by one over-current detection, the lighting is turned off even in a case of a temporal intermittence or the like.

The above Patent Documents 2 and 3 are configured to control the supply current in order not to be excessive when the wiring connected to the LED is disconnected, and Patent Document 4 is configured to suppress the occurrence of an overshooting during the intermittent operation; however, these are structurally configured such that no over-current flows even when the wiring connected to the LED is disconnected. In any of these Patent Documents 2 to 4, in order to suppress the over-current produced under the abnormal situation, a component or an auxiliary circuit for current limitation is added thereto; thus, there is a problem such that the product is enlarged, so that the cost is also increased.

The present invention is made to solve the aforementioned problems, and an object of the invention is to provide an LED lighting device that suppresses the deterioration of an LED by controlling an over-current at the time of restoration from disconnection without an additional component, and also avoids an extinction thereof due to a false operation by checking whether the disconnection is transient or continuous.

Means for Solving the Problems

An LED lighting device according to the invention includes: a power source unit that converts a voltage supplied from a power source to a voltage for lighting an LED; a current detection unit that detects an output current electrified from the power source unit to the LED; a voltage detection unit that detects an output voltage applied from the power source to the LED; and a control unit that controls an operation of the power source unit, wherein the control unit causes the power source unit to repeat a temporary stop and a temporary operation, in either one or both of the cases where the output current detected by the current detection unit is decreased and where the output voltage detected by the voltage detection unit is increased during a normal operation of the power source unit, checks either one or both of the detected current and the detected voltage at each time of the corresponding temporary operation, causes the power source unit to normally operate if either one or both of the decreased output current and the increased output voltage is not detected any longer before a predetermined number of times of the repetition or a predetermined period of time is reached, and causes the power source unit to stop continuously if either one or both of the decreased output current and the increased output voltage are detected even when the predetermined number of times of the repetition or the predetermined period of time is reached.

Effect of the Invention

According to the invention, since it is configured that if either one or both of the decreased output current and the increased output voltage are detected, an occurrence of disconnection is determined, and that the power source unit is first stopped temporarily, it is possible to suppress an over-current at the time of the restoration from the disconnection without an additional component, thereby suppressing the deterioration of the LED due to the over-current. Subsequently, it is configured that the temporary stop and temporary operation of the power source unit are repeated, and that the power source unit is stopped continuously if the disconnection is not restored even when the predetermined number of times of the repetition or the predetermined period of time is reached, thereby avoiding the extinction of the light due to a false operation.

BRIEF DESCRIPTION OF THE DRAWINGS

FIG. 4 is a flowchart showing a disconnection detection process of the LED lighting device according to Embodiment 1.

FIG. 5 is a diagram for illustrating an operation at the time of the occurrence of a short transient disconnection of the LED lighting device according to Embodiment 1.

BEST MODE FOR CARRYING OUT THE INVENTION

In the following, in order to describe the present invention in more detail, embodiments for carrying out the invention will be described with reference to the attached drawings.

Embodiment 1

Figure 1:
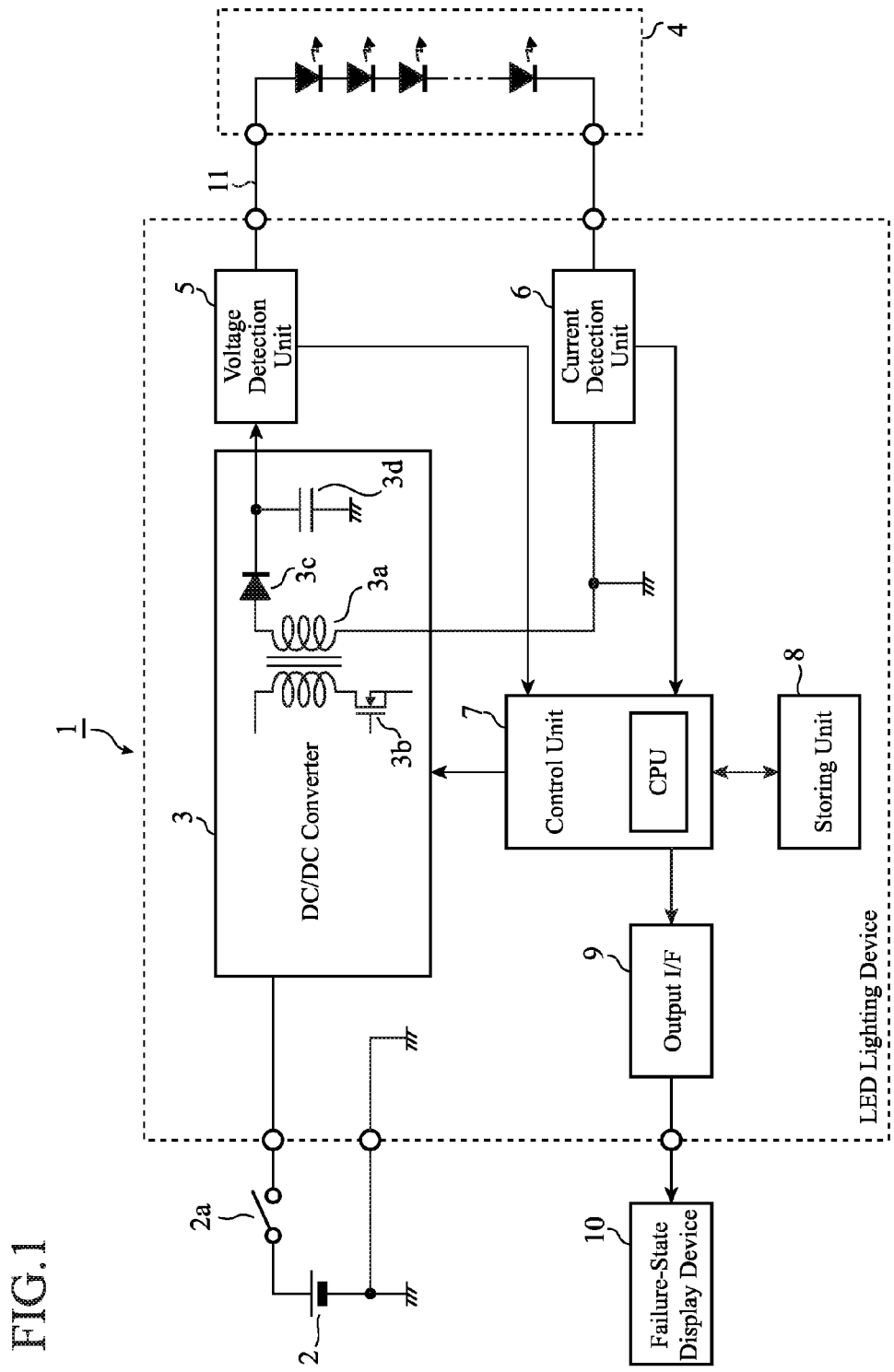
FIG. 1 is a block diagram showing a configuration of an LED lighting device according to Embodiment 1 of the present invention.

An LED lighting device 1 shown in FIG. 1 is a device for lighting an LED light source 4 by using a DC voltage from a DC power source 2, and includes a DC/DC converter 3, a voltage detection unit 5, a current detection unit 6, a control unit 7, a storing unit 8 and an output interface (hereinafter, abbreviated to "I/F") 9. The DC power source 2 is a power source for supplying a DC voltage to the DC/DC inverter 3, and the DC voltage to the DC/DC inverter 3 is supplied or shut off by a power switch 2a. The LED light source 4 is constituted by connecting a plurality of LEDs in series and is connected to the LED lighting device 1 through a connection wiring 11. In Embodiment 1, a case where the LED light source 4 is applied to a vehicle-mounted head lamp is described by way of example. A failure-state display device 10 is what is called a telltale, and is installed inside an instrument-panel that is assembled to a dashboard.

The DC/DC converter (power source unit) 3 is constituted by a transformer 3a, a switching element 3b including a MOS-type field effect transistor, a rectifying diode 3c and a smoothing capacitor 3d. By the DC/DC converter 3, the voltage supplied from the DC power source 2 is converted to a voltage for lighting the LED light source 4. In the DC/DC converter 3, the switching element 3b is switching-controlled by an output signal from the control unit 7 to store magnetic energy in the transformer 3a, and when the energy is discharged, the voltage generated in the transformer 3a is rectified by the rectifying diode 3c and smoothed by the smoothing capacitor 3d to thereby produce a DC voltage.

The voltage detection unit 5 measures the voltage applied to the LED light source 4. The current detection unit 6 detects the current electrified to the LED light source 4. The storing unit 8 stores a current value and a voltage value (abnormality determination values $L_{thr}$ and $V_{thr}$ described later) that are required to detect a disconnection of the connection wiring 11.

The control unit 7 is constituted by a microcomputer having a CPU, and performs calculation to control the DC/DC converter 3, and also informs the external failure-state display device 10 of an occurrence of abnormality on the LED light source 4 through the output I/F (output unit) 9. In order to supply to the LED light source 4 a predetermined value of current for achieving an amount of luminescence required as a light source for the head lamp, the control unit 7 supplies to the switching element 3b of the DC/DC converter 3 a PWM (Pulse Width Modulation) control output so that the output current to the LED light source 4 detected by the current detection unit 6 is kept constant. Further, the control unit 7 detects a continuous disconnection of the connection wiring 11 and stops the DC/DC converter 3 to thereby extinguish the LED light source 4. The details will be described later.

Figure 2:
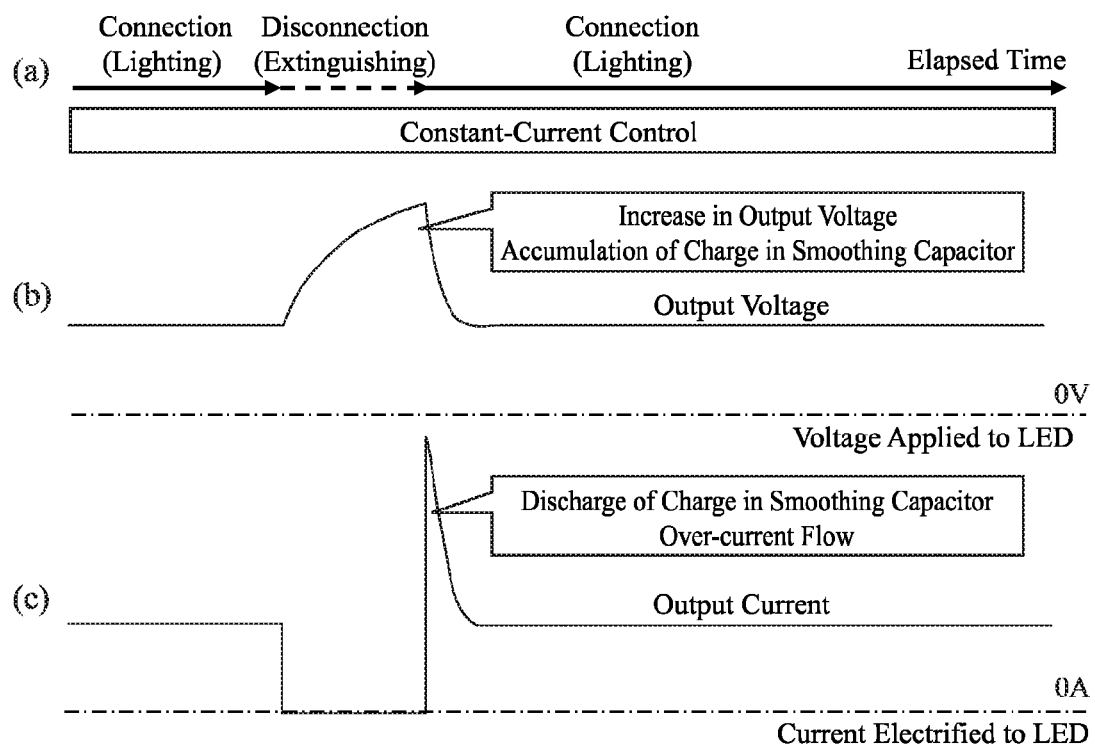
FIG. 2 is a diagram for illustrating changes in output voltage and output current at the time of the occurrence of a disconnection in a case of no means for suppressing an over-current.

FIG. 2 illustrates a diagram for illustrating changes in output voltage and output current thereof at the time of the occurrence of a disconnection on the assumption that the LED lighting device 1 has no means for suppressing an over-current. FIG. 2(a) shows a connection state of the connection wiring and an operation state of the DC/DC converter 3; FIG. 2(b) shows a change in the output voltage applied to the LED light source 4; and FIG. 2(c) shows a change in the output current electrified to the LED light source 4.

In the case of a common LED lighting device having a configuration to light the LED light source 4 by supplying a constant current thereto with the use of the DC/DC converter 3 including the smoothing capacitor 3d, when the connection wiring 11 connected to the LED light source 4 is disconnected, the output voltage is increased while charges are stored in the smoothing capacitor 3d of the DC/DC converter 3, as shown in FIG. 2(b). In such a situation, when the connection wiring 11 is connected thereto again, as shown in FIG. 2(c), the charges stored in the smoothing capacitor 3d are flown into the LED light source 4 to cause the over-current, resulting in deterioration of the LEDs.

In particular, in a case where the LED light source 4 is applied to the vehicle-mounted head lamp, if there is an insufficient contact with a connector joining portion for connecting the LED lighting device 1 and the LED light source 4, an intermittence is likely to occur due to shake by vibrations of the vehicle body. Note that a high-brightness LED for the head lamp is electrified by a large current to thus have a small margin for the over-current, and therefore the deterioration with respect to the over-current is large.

In order to suppress the over-current, it is considered to newly add a component for limiting the over-current thereto, in addition to the components constituting the DC/DC converter 3, as in Patent Documents 2 to 4 discussed previously; however, a product may be increased in size due to the addition of the components, resulting in rising cost thereof.

Further, as discussed in Patent Document 1, when it is contemplated to stop the output of the DC/DC converter 3 if one over-current is detected, there is a possibility to extinguish the light due to a false operation.

Therefore, in the LED lighting device 1 according to Embodiment 1, the control unit 7 causes the DC/DC converter 3 to immediately stop when the output current is shut off due to the disconnection, and further causes the DC/DC converter 3 to repeat a temporary stop and a temporary operation a predetermined number of times (for example, ten times) in order to check whether the shut-off of the output current is transient or continuous; if the shut-off is determined to be a one-shot, transient one, the lighting is continued without performing a particular operation as it stands, and if it is determined to be a continuous one, the DC/DC converter 3 is stopped to extinguish the LED light source 4.

Figure 3:
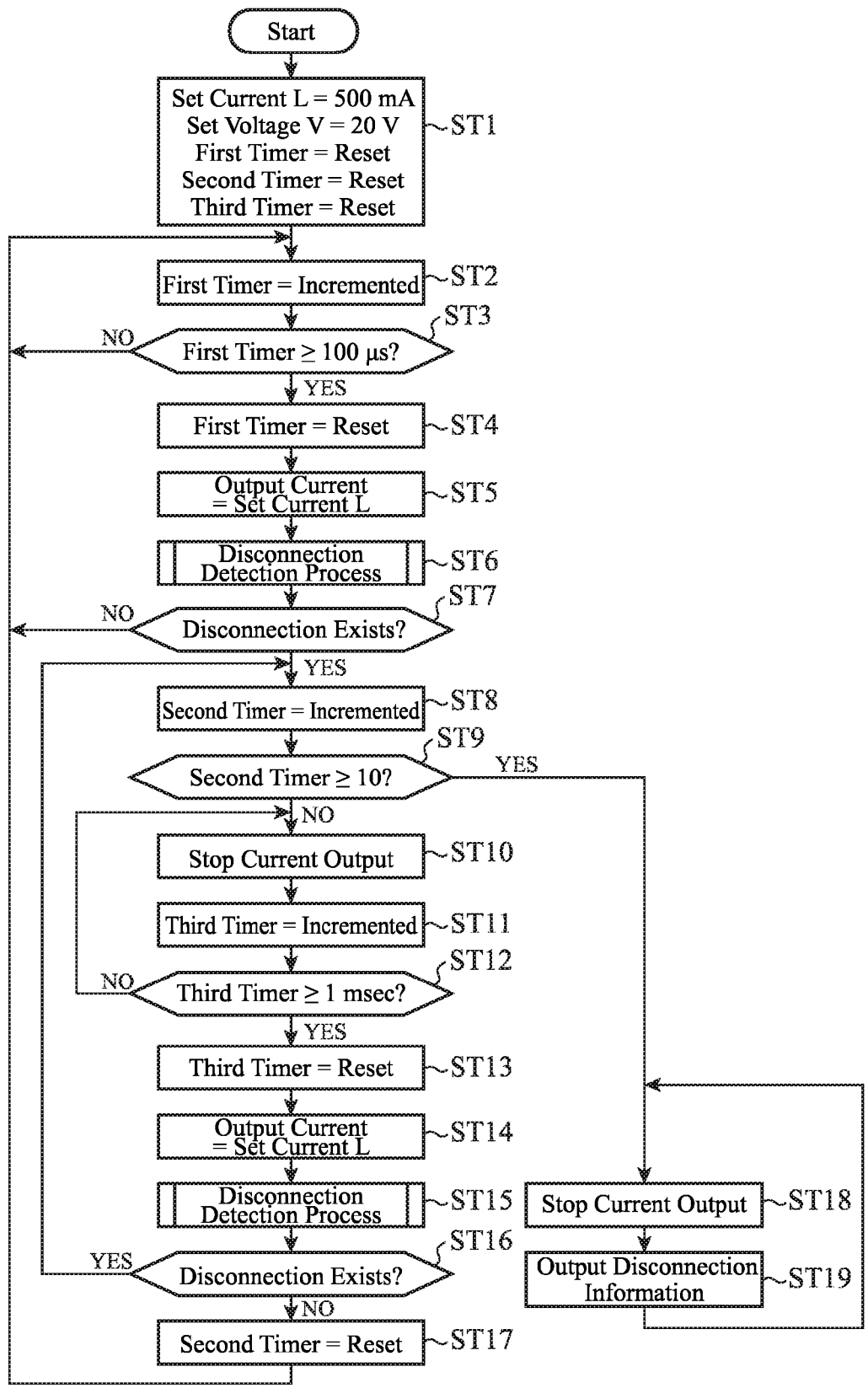
FIG. 3 is a flowchart showing an operation of the LED lighting device according to Embodiment 1.

Next, an operation of the LED lighting device 1 according to Embodiment 1 will be described with reference to a flowchart shown in FIG. 3.

An ON operation of the power switch 2a starts supplying a DC voltage, and the control unit 7 first performs an initial process after the LED lighting device 1 starts a lighting operation (Step ST1). Specifically, a rated output current (for example, 500 mA) and a forward voltage (for example, 20 V) of the LED light source 4 are set as set values (set current L and set voltage V) for constant current control, respectively. Further, the control unit 7 includes first to third timers counted by the CPU with the use of, for example, a clock signal, and resets the respective values of the first to third timers in the initial process.

The control unit 7 repeats a setting of alighting operation for the LED light source 4 and a disconnection detection of the connection wiring 1 for each 100 psec (Steps ST2 to ST6).

The first timer is a timer for counting 100 psec. The control unit 7 increments the count value of the first timer until it reaches 100 μsec (Steps ST2 and ST3) and resets the timer once it reaches 100 μsec (Step ST3 "YES", and ST4). Subsequently, the control unit 7 controls the DC/DC converter 3 in order to output the set current L, that is, to bring the output current detected by the current detection unit 6 to the set current L (Step ST5).

In Step ST6, the control unit 7 performs a disconnection detection process based on the output voltage detected by the voltage detection unit 5 and the output current detected by the current detection unit 6. Here, the details of the disconnection detection process in Step ST6 will be described with reference to a flowchart shown in FIG. 4.

First, the output current is measured by the current detection unit 6 (Step ST6-1), and then the control unit 7 detects a decrease (or shut-off) of the output current (Step ST6-2). In this example, the abnormality determination value $L_{thr}$ for disconnection detection is given as one-tenth relative to the set current L; it is determined "existence of disconnection" (Step ST6-5) if the output current is the abnormality determination value $L_{thr}$ or less (Step ST6-2 "YES").

On the other hand, if the output current is larger than the abnormality determination value $L_{thr}$ (Step ST6-2 "NO"), it is assumed absence of disconnection; subsequently, the output voltage is measured by the voltage detection unit 5 (Step ST6-3), and the control unit 7 detects an increase of the output voltage (Step ST6-4). This is because the disconnection can be also detected by the detection of the increase of the output voltage, as well as the above detection of the shut-off of the current, since the shut-off of the output current naturally increases the output voltage.

In this example, the abnormality determination value $V_{thr}$ is given as 1.1 times relative to the set voltage V, and it is determined "existence of disconnection" (Step ST6-5) if the output voltage is the abnormality determination value $V_{thr}$ or more (Step ST6-4 "YES"). On the other hand, if it is less than the abnormality determination value $V_{thr}$ (Step ST6-4 "NO"), it is assumed absence of disconnection.

In this connection, it should be implemented by a configuration such that when the abnormality determination values $L_{thr}$ and $V_{thr}$ calculated in advance are stored in the storing unit 8, the control unit 7 uses the values by reading out them.

Also, in FIG. 4, it is contemplated that the existence or absence of the disconnection is determined by the detections of the decrease in the output current and the increase in the output voltage; however, the existence or absence of the disconnection may be determined by the detection of only either one of them.

When the disconnection is detected by performing the disconnection detection process shown in FIG. 4 (Step ST7 "YES" in FIG. 3), the control unit 7 subsequently repeats the temporary stop and temporary operation of the DC/DC converter 3 ten times and determines whether the disconnection is transient or continuous (Steps ST8 to ST16).

The second timer is a counter that counts the number of repetitions (repeat count) of the temporary stop and temporary operation of the DC/DC converter 3, and the control unit 7 increments the count value of the second timer until it reaches ten (Steps ST8 and ST9).

In order to avoid an over-current at the time of a restoration, when the disconnection is detected, the control unit 7 first causes the DC/DC converter 3 to stop temporarily (Step ST10).

The third timer is a timer that counts a temporarily stopping time (for example, 1 msec) of the DC/DC converter 3; the control unit 7 increments the count value of the third timer until it reaches 1 msec (Steps ST11 and ST12), and resets the third timer when it reaches 1 msec (Steps ST12 "YES", ST13). Then, in the following Step 14, for the check of conduction, the DC/DC converter 3 is temporarily operated, and controlled so that the set current L is output.

During the temporary operation, the control unit 7 performs the disconnection detection process again (Step ST15), and if the disconnection is detected (Step ST16 "YES"), the flow returns to Step ST8. The disconnection detection process in Step ST15 is the same as that in Step ST6.

As mentioned above, while the temporary stop and the temporary operation of the DC/DC converter 3 are repeated ten times, if a steady state of lighting is established, the disconnection becomes undetected in Step ST 15 (Step ST16 "NO"); thus, the disconnection detected in the previous Step ST6 can be determined to be transient. Therefore, the control unit 7 performs no particular control and resets the second timer (Step ST17), and executes a normal operation by returning to Step ST2.

On the other hand, even when the temporary stop and temporary operation of the DC/DC converter 3 are repeated ten times, if the steady state of lighting is not established and the disconnection is still detected (Step ST9 "YES"), the control unit 7 determines that the disconnection detected in the previous Step ST6 is continuous and that an abnormal situation occurs; in the following Step ST18, the DC/DC converter 3 is stopped continuously, and in Step ST19, informs the failure-state display device 10 of the disconnection information through the output I/F 9.

It is noted that when the DC/DC converter 3 is stopped continuously due to the abnormal situation, the control unit 7 uses an OFF of the power switch 2a as a cancellation condition, and maintains the stopped state of the DC/DC converter 3 until the power supply from the DC power source 2 is stopped. As a result, the head lamp is prevented from blinking even if a chattering phenomenon and the like occurs during the time of from the determination of the abnormal situation to the stop of the power supply from the CD power source 2. Further, in a case where there exists a transient disconnection that is longer than a period of time required for repeating the temporary stop and the temporary operation of the DC/DC converter 3 a predetermined number of times, it is determined an abnormal situation, and the head lamp is extinguished, but the lamp is lighted again when the power switch 2a is ON/OFF operated.

FIG. 5 is a diagram for illustrating an operation of the LED lighting device 1 of Embodiment 1 at the time of the occurrence of a short transient disconnection.

In a steady state of lighting, when detecting the disconnection, the control unit 7 first stops temporally the output of the DC/DC converter 3 to avoid an accumulation of charges in the smoothing capacitor 3d. Thereafter, in order to check whether the shut-off of the output current is transient or continuous, the control unit 7 causes the DC/DC converter 3 to repeat the temporary stop and temporary operation, resulting in executing the check process. In this example, the disconnection is restored during a first temporary stop, and a restoration from the disconnection is detected by the following first temporary operation, so that the control unit 7 completes the repetition of the check process and maintains the steady state of lighting as it stands.

Figure 6:
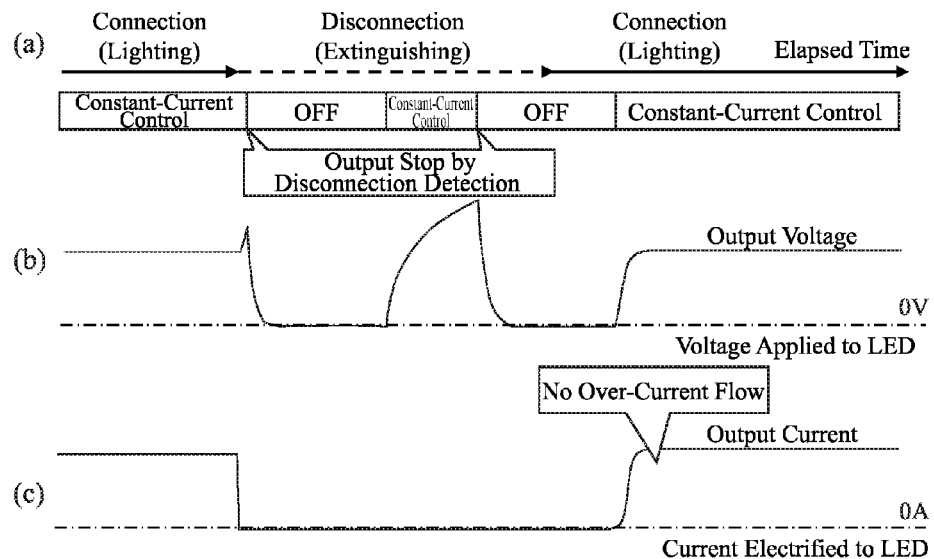
FIG. 6 is a diagram for illustrating an operation at the time of the occurrence of a slightly longer transient disconnection of the LED lighting device according to Embodiment 1.

FIG. 6 is a diagram for illustrating an operation of the LED lighting device 1 of Embodiment 1 at the time of the occurrence of a slightly longer transient disconnection.

If the disconnection is not restored even when each of the temporary stop and temporary operation of the DC/DC converter 3 is performed once, then the second temporary stop and temporary operation is performed. In this example, the disconnection is restored during the second temporary stop, and the restoration from the disconnection is detected by the following second temporary operation, so that the control unit 7 completes the repetition of the check process and maintains the steady state of lighting as it stands.

Figure 7:
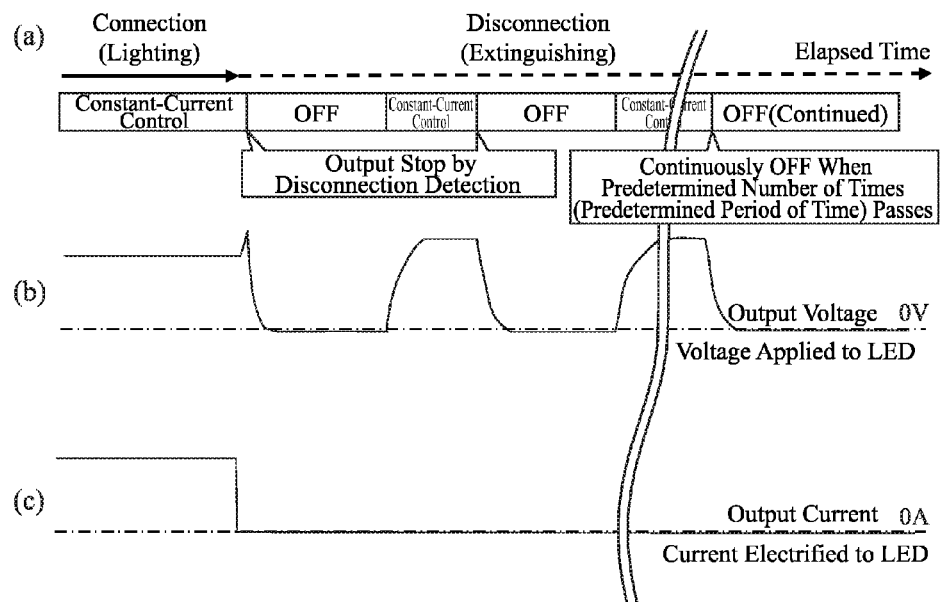
FIG. 7 is a diagram for illustrating an operation at the time of the occurrence of a continuous disconnection of the LED lighting device according to Embodiment 1.

FIG. 7 is a diagram for illustrating an operation of the LED lighting device 1 of Embodiment 1 at the time of the occurrence of a continuous disconnection.

If the disconnection is not restored even when each of the temporary stop and temporary operation of the DC/DC converter 3 are repeated ten times, the control unit 7 determines an existence of an abnormal situation, stops the DC/DC converter 3 continuously and also outputs to the failure-state display device 10 disconnection information indicating an occurrence of the abnormal situation.

In FIG. 5 to FIG. 7, the DC/DC converter 3 is stopped temporarily upon the occurrence of the disconnection, and hence charges are not accumulated in the smoothing capacitor 3d, so that no over-current flows at the time of the restoration. Further, in the check process, the period of time for each temporary stop is 1 msec, which is short, and hence the illumination intensity of the LED light source 4 is almost unchanged in the case of the transient disconnection.

From the above, the LED lighting device 1 according to Embodiment 1 is configured to include: the DC/DC converter 3 that converts the voltage supplied from the DC power source 2 to the voltage for lighting of the LED light source 4; the voltage detection unit 5 that detects the voltage applied to the LED light source 4; the current detection unit 6 that detects the current electrified to the LED light source 4; and the control unit 7 that controls the operation of the DC/DC converter 3, and it is configured as follows: the control unit 7 causes the DC/DC converter 3 to repeat the temporary stop and temporary operation, in either one or both of the cases where the output current detected by the current detection unit 6 is decreased and where the output voltage detected by the voltage detection unit 5 is increased during the normal operation of the DC/DC converter 3; checks either one or both of the output current and the output voltage at each time of the corresponding temporary operation; and causes the DC/DC converter 3 to normally operate if either one or both of the decreased output current and the increased output voltage become undetected before a predetermined number of times of the repetition is reached; and causes the DC/DC converter 3 to stop continuously if either one or both of the decreased output current and the increased output voltage are detected even when the predetermined number of times of the repetition is reached.

In this manner, since it is configured that the control unit 7 determines the occurrence of a disconnection if either one or both of the decreased output current and the increased output voltage are detected, and first causes the DC/DC converter 3 to stop temporarily, it is possible to suppress the over-current at the time of the restoration from the disconnection, to thereby achieve the LED lighting device 1 that induces no deterioration in the LED due to the over-current. In addition, since the over-current can be suppressed by the process of the control unit 7, a conventional component for suppressing the over-current is not used; thus, the low cost and compact LED lighting device 1 can be achieved. Further, since the temporary stop and temporary operation of the DC/DC converter 3 are repeated the predetermined number of times for the check of the disconnection, it is possible to avoid the extinction due to a false operation, to thereby enhance the reliability. Furthermore, since the period for each temporary stop of the DC/DC converter 3 is short, the illumination intensity of the LED light source 4 is almost unchanged in the case of the temporary disconnection.

Also, according to Embodiment 1, since it is configured such that the continuous stop of the DC/DC converter 3 is maintained until the power supply from the DC power source 2 is stopped, the LED lighting device 1 that prevents the LED light source 4 from blinking can be achieved even when the disconnection occurs intermittently.

Also, according to Embodiment 1, the LED lighting device 1 is configured to include the output I/F 9 that informs the failure-state display device 10 of the stop of the DC/DC converter 3, after the repetition of the temporary stop and temporary operation of the DC/DC converter 3 reaches the predetermined number of times of the repetition and further the DC/DC converter 3 is brought to the continuous stop. For this reason, when there is of no influence on the travel of the vehicle like, for example, a transient disconnection due to vibrations, no notification thereof to the driver is ensured, which enables to continue a safety driving operation without diversion of his/her attention.

Embodiment 2

In the above Embodiment 1, in order to check whether the disconnection is transient or continuous, it is configured that the temporary stop and the temporary operation of the DC/DC converter 3 are repeated the predetermined number of times, whereas in Embodiment 2, it is configured that the temporary stop and temporary operation are repeated for a predetermined period of time. It is noted that since an LED lighting device of Embodiment 2 has a similar configuration in the drawing to that of the LED lighting device shown in FIG. 1, the following will be described with the aid of FIG. 1.

Figure 8:
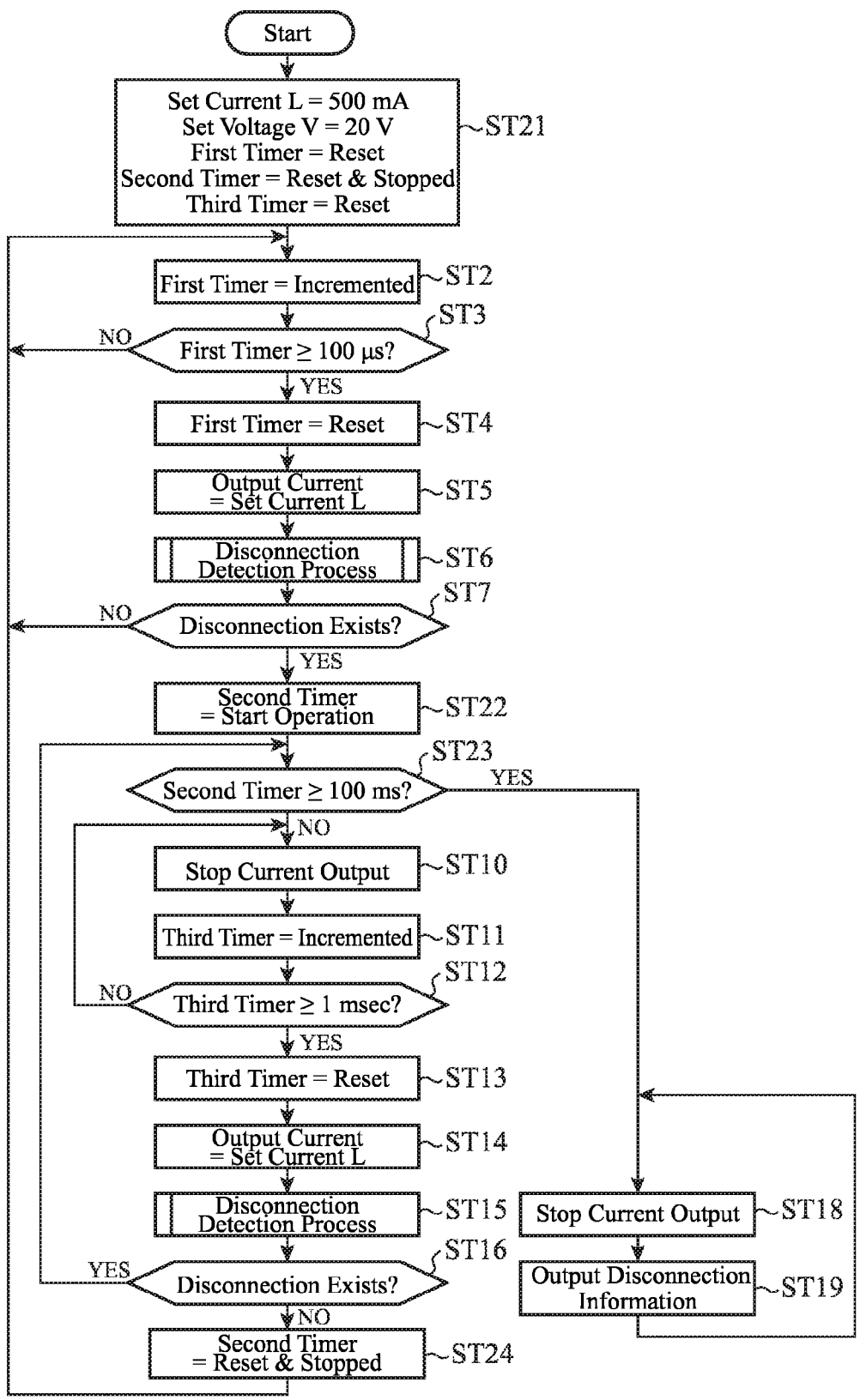
FIG. 8 is a flowchart showing an operation of an LED lighting device according to Embodiment 2 of the invention.

Next, an operation of the LED lighting device 1 according to Embodiment 2 will be described with reference to a flowchart shown in FIG. 8. Hereupon, in FIG. 8, Steps ST2 to ST7, ST10 to ST16, ST18 and ST19 are similar processes to those in FIG. 3, and hence their descriptions will be omitted; the description will be given focusing on particular Steps ST21 to ST24 in Embodiment 2.

In Embodiment 2, a second timer is provided as a timer that counts a repetition period of time (for example, 100 msec) of the temporary stop and temporary operation of the DC/DC converter 3. In an initial process (Step ST21), the control unit 7 resets the value of the second timer to be put in a stopped state.

Then, when a disconnection is detected in Steps ST6 and ST7 (Step ST7 "YES"), the control unit 7 initiates the operation of the second timer (Step ST22) and causes the DC/DC converter 3 to repeat the temporary stop and temporary operation for 100 msec, to thereby determine whether the disconnection is transient or continuous (Steps ST23 and ST10 to ST16).

Then, if a steady state of lighting is established during 100 msec, the disconnection becomes undetected in Step ST15 and ST16 (Step ST16 "NO"); thus, the disconnection detected in the previous Steps ST6 and ST7 can be determined to be transient. Therefore, the control unit 7 performs no particular control and resets and stops the second timer (Step ST24), and the flow returns to Step ST2 to execute a normal operation.

On the other hand, if the steady state of lighting is not established and the disconnection is still detected though the temporary stop and temporary operation of the DC/DC converter 3 is repeated for 100 msec (Steps ST16 "YES", ST23 "YES"), the control unit 7 determines that the disconnection detected in Steps ST6 and ST7 is continuous and that an abnormal situation occurs; then, the control unit causes the DC/DC converter 3 to stop continuously (Step ST18) and outputs the disconnection information to the failure-state display device 10 through the output I/F 9 (Step ST19).

From the above, according to Embodiment 2, it is configured as follows: the control unit 4 causes the DC/DC converter 3 to repeat the temporary stop and temporary operation in either one or both of the cases where the output current detected by the current detection unit 6 is decreased and where the output voltage detected by the voltage detection unit 5 is increased during the normal operation of the DC/DC converter 3; checks either one or both of the output current and the output voltage at each time of the corresponding temporary operation; causes the DC/DC converter 3 to normally operate if either one or both of the decreased output current and the increased output voltage become undetected before a predetermined period of time is reached; and causes the DC/DC converter 3 to stop if either one or both of the decreased output current and the increased output voltage are detected even when the predetermined period of time is reached. For this reason, similarly to the above Embodiment 1, it is possible to suppress the over-current without the additional component, to thereby achieve the low cost and compact LED lighting device 1 that induces no deterioration in the LED. In addition, since the temporary stop and temporary operation of the DC/DC converter 3 are repeated for the predetermined period of time for the check of the disconnection, it is possible to avoid the extinction due to a false operation, to thereby enhance the reliability. Further, since the period for each temporary stop of the DC/DC converter 3 is short, the illumination intensity of the LED light source 4 is almost unchanged in the case of the temporary disconnection.

Embodiment 3

Since an LED has a constant voltage characteristic, no current is flown therein when a specific voltage is not applied thereto. Therefore, in order to carry out a conduction check of a wiring (disconnection detection process), it is necessary to apply thereto a voltage that exceeds a forward voltage of the LED. However, an application of an excessive voltage may deteriorate the LED due to an over-current at the time of the restoration of an electrification. For example, in FIG. 6, if the disconnection is restored during a first temporary operation, the over-current may be produced since a voltage higher than a set voltage is applied thereto.

Therefore, in Embodiment 3, in order to prevent the excessive voltage of the applied voltage, it is contemplated that the disconnection detection process is performed in such a manner that a voltage adding a slight margin to a voltage having been outputted in an immediately preceding normal operation is applied thereto together with a constant-voltage control.

Hereupon, an LED lighting device of Embodiment 3 has a similar configuration in the drawing to that of the LED lighting device 1 shown in FIG. 1, and hence the following will be described with the aid of FIG. 1.

Figure 9:
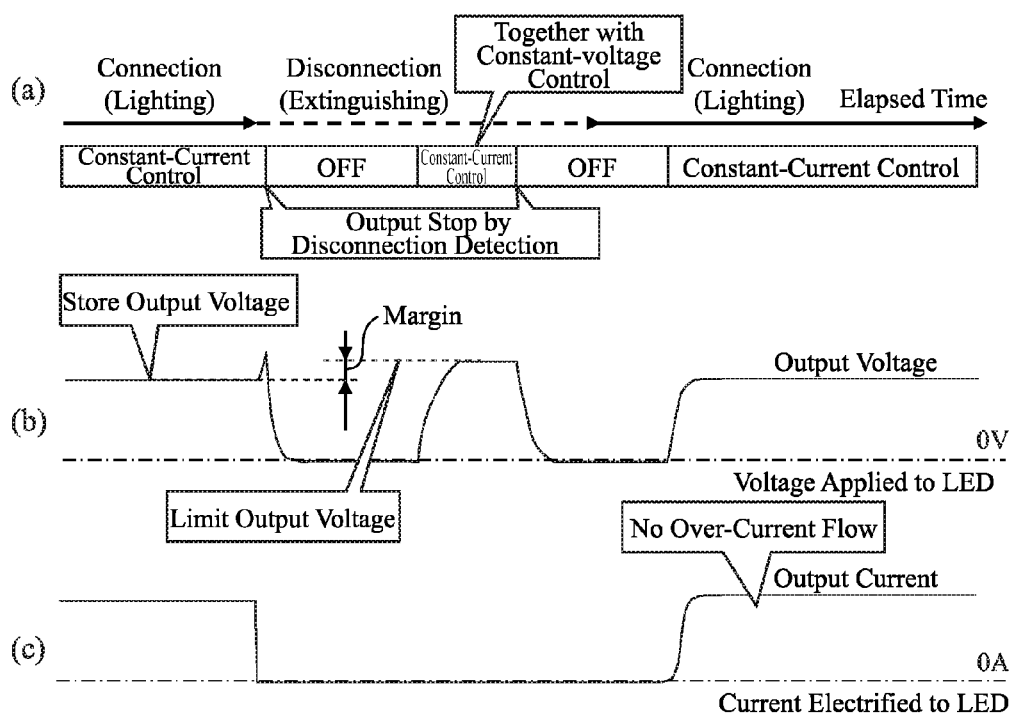
FIG. 9 is a diagram for illustrating an operation at the time of the occurrence of a slightly longer transient disconnection of an LED lighting device according to Embodiment 3.

FIG. 9 is a diagram for illustrating an operation of the LED lighting device 1 of Embodiment 3 at the time of the occurrence of a slightly longer transient disconnection.

A control unit 7 causes the storing unit 8 to store a value of an output voltage in the normal operation (for example, 20 V) by outputting the value of the output voltage measured by the voltage detection unit 5 to the storing unit 8 at a predetermined timing, for example, every one hour, every 10 minutes, or the like. Then, when a disconnection is detected, a DC/DC converter 3 is stopped temporarily; subsequently, when the DC/DC converter 3 is stopped temporarily for the disconnection detection process, the control is performed to output a voltage that adds a predetermined voltage (for example, 3 V) to the immediately preceding output voltage 20 V stored in the storing unit 8 (FIG. 3 and Step ST14 in FIG. 8). In this manner, the output voltage during the temporary operation is limited as shown in FIG. 9(b); thus, the conduction check is possible with a certain level of voltage that electrifies no over-current even if the disconnection is restored during the temporary operation.

It is noted that in the above Embodiments 1 and 2, as the abnormality determination value $V_{thr}$ for the disconnection detection, the value that is 1.1 times the set voltage V set in the initial process is used (FIG. 4, Step ST6-4); however, like the present Embodiment 3, a voltage adding a predetermined margin to the output voltage in the immediately preceding normal operation may be used as the abnormality determination value $V_{thr}$.

Specifically, for each disconnection detection process, the control unit 7 has only to renew the abnormality determination value $V_{thr}$, in such a manner that the output voltage of the immediately preceding normal operation stored in the storing unit 8 is multiplied by 1.1 times, or that a predetermined voltage is added to the corresponding output voltage.

A forward voltage of the LED light source 4 actually varies widely in individual LEDs, and varies also depending on a temperature, and hence in order to use the forward voltage as the abnormality determination value $V_{thr}$, a significant amount of margin from the set voltage V is necessary, and also it is difficult to fix at a specific voltage value thereof with high accuracy. From such a reason, when the abnormality determination value $V_{thr}$ based on the output voltage in the immediately preceding normal operation is used, the accuracy of the disconnection detection can be improved.

From the above, according to Embodiment 3, it is configured that the LED lighting device 1 includes the storing unit 8 for storing the output voltage during the normal operation of the DC/DC converter 3, and that at the time of the temporary operation, the control unit 7 performs control to output a voltage adding a predetermined voltage to the output voltage stored in the storing unit 8 from the DC/DC converter 3. For this reason, upon the disconnection check, the conduction check can be carried out with a voltage that electrifies no over-current, and hence no LED is deteriorated.

It is noted that according to the present invention, within the scope of the invention, the embodiments can be freely combined, or any components in the embodiments can be modified or any components in the embodiments can be omitted.

INDUSTRIAL APPLICABILITY

As described above, since the LED lighting device of the present invention is configured to suppress the over-current without additional components and extinguish the light without causing a false operation with respect to an intermittent disconnection, it is suitable for use in an LED lighting device of a headlamp using a vehicle-mounted LED light source susceptible to intermission thereof under the vibrations of a vehicle, especially a head lamp using a high-brightness LED which exhibits an extensive deterioration by the over-current.

DESCRIPTION OF REFERENCE NUMERALS

1: LED lighting device, 2: DC power source, 2a: power switch, 3: DC/DC converter, 3a: transformer, 3b: switching element, 3c: rectifying diode, 3d: smoothing capacitor, 4: LED light source, 5: voltage detection unit, 6: current detection unit, 7: control unit, 8: storing unit, 9: output I/F, 10: failure-state display device, 11: connection wiring.

The invention claimed is:

1. An LED lighting device comprising:
a power converter to convert a voltage supplied from a power source to a voltage for lighting an LED;
a current detector to detect an output current supplied from the power converter to the LED;
a voltage detector to detect an output voltage applied from the power converter to the LED; and
a controller to cause the power converter to repeat a temporary stop and a temporary operation alternately when the output current detected by the current detector is decreased and/or when the output voltage detected by the voltage detector is increased during a normal operation of the power converter,
to check the detected current and/or the detected voltage each time the temporary operation is performed,
to cause the power converter to normally operate if the decreased output current and/or the increased output voltage is no longer detected before a predetermined number of times of the repetition or a predetermined period of time is reached, and
to cause the power converter to stop continuously if the decreased output current and/or the increased output voltage is detected when the predetermined number of times of the repetition or the predetermined period of time is reached.

2. The LED lighting device according to claim 1, further comprising a memory for memorizing the output voltage during a normal operation of the power converter, wherein at the time of the temporary operation the controller causes the power converter to output a summed voltage of a predetermined voltage and the output voltage stored in the memory.

3. The LED lighting device according to claim 1, wherein the continuous stop of the power converter is maintained until the supplied voltage from the power source is stopped.

4. The LED lighting device according to claim 1, further comprising an output interface to output the continuous stop of the power converter.

* * * * *